(12) United States Patent
Schweizer et al.

(10) Patent No.: US 8,091,967 B2
(45) Date of Patent: Jan. 10, 2012

(54) SPINDLE DRIVE FOR A LUMBAR SUPPORT IN THE BACKREST STRUCTURE OF A MOTOR VEHICLE SEAT

(75) Inventors: Sebastian Schweizer, Coburg (DE); Cornelia Brueckner, Weidach (DE); Wera Wolniczak, Grub am Forst (DE); Guido Neumann, Ilmenau (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 212 days.

(21) Appl. No.: 12/556,952

(22) Filed: Sep. 10, 2009

(65) Prior Publication Data

US 2010/0066144 A1  Mar. 18, 2010

(30) Foreign Application Priority Data

Sep. 10, 2008  (DE) .......................... 10 2008 047 248

(51) Int. Cl.
*A47C 7/46* (2006.01)
(52) U.S. Cl. .................................. 297/284.8; 297/284.7
(58) Field of Classification Search ............... 297/284.4, 297/284.7, 284.8
See application file for complete search history.

(56) References Cited

U.S. PATENT DOCUMENTS

| 5,836,651 | A | * | 11/1998 | Szerdahelyi et al. | ......... 297/410 |
| 6,254,186 | B1 | * | 7/2001 | Falzon | ....................... 297/284.1 |
| 6,338,530 | B1 | * | 1/2002 | Gowing | ..................... 297/284.4 |
| 6,695,402 | B2 | | 2/2004 | Sloan, Jr. | |
| 7,488,039 | B2 | | 2/2009 | Fischer et al. | |
| 2007/0057548 | A1 | | 3/2007 | Buffa | |
| 2007/0216207 | A1 | * | 9/2007 | Stossel et al. | ............. 297/284.4 |
| 2009/0091169 | A1 | * | 4/2009 | Neumann et al. | ......... 297/284.4 |

FOREIGN PATENT DOCUMENTS

DE  203 13 925 U1  11/2004
FR  2 766 135 A1  1/1999

* cited by examiner

*Primary Examiner* — Milton Nelson, Jr.
(74) *Attorney, Agent, or Firm* — Christie, Parker & Hale, LLP

(57) ABSTRACT

A spindle drive for a lumbar support in a backrest structure of a motor vehicle seat includes two gliders guided on a carrier of the lumbar support. Each glider is connected to a spindle nut which is engaged with an associated thread section of a spindle. The thread sections have threads of opposite thread pitch, so that the gliders are movable in opposite directions and pivot towards and away from the carrier supporting bails of a supporting device hinged to the carrier and being adjustable substantially perpendicular to the carrier. At least one of the spindle nuts partly encompasses the spindle and can be clipped onto its associated thread section of the spindle.

15 Claims, 8 Drawing Sheets

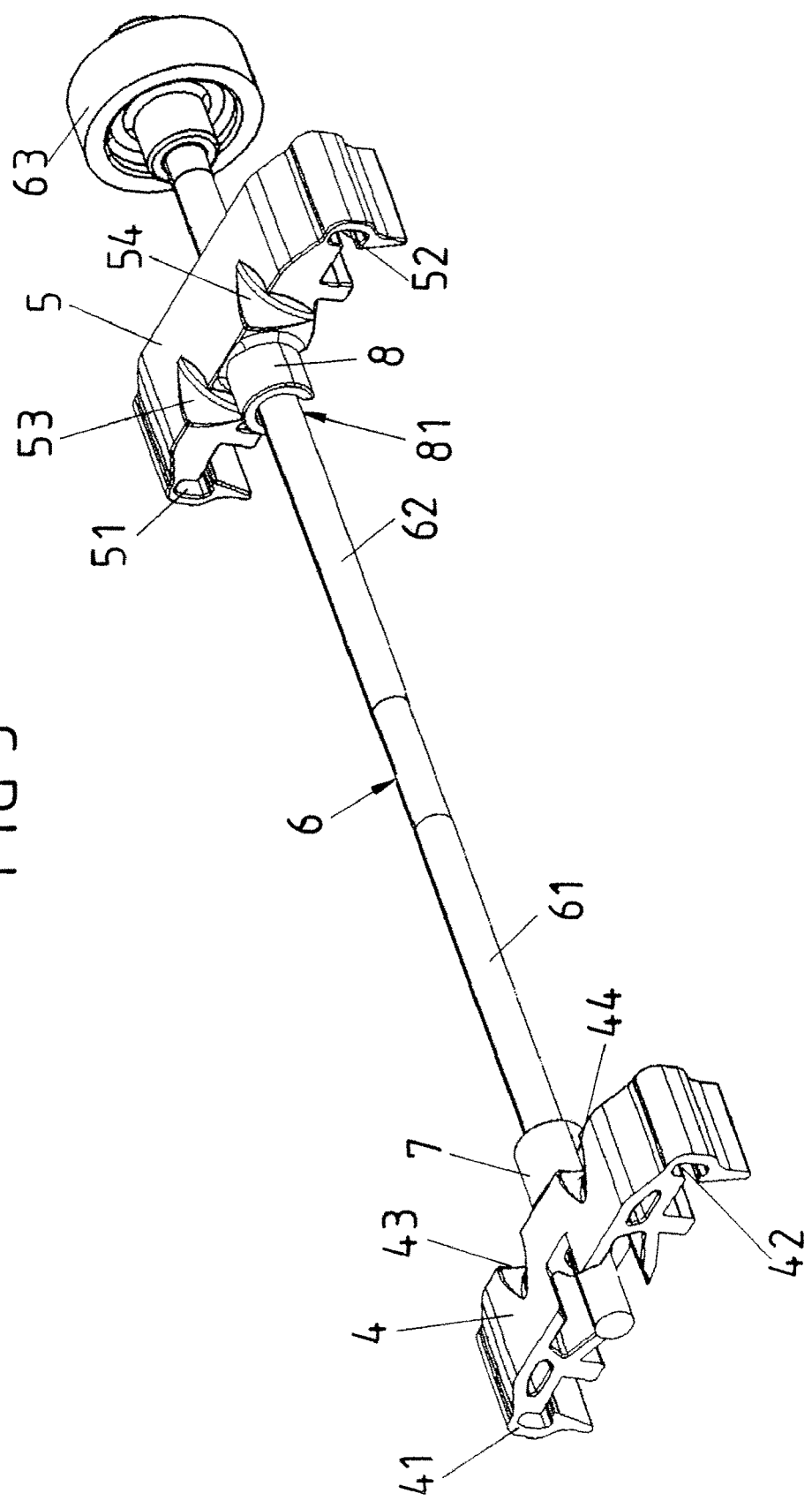

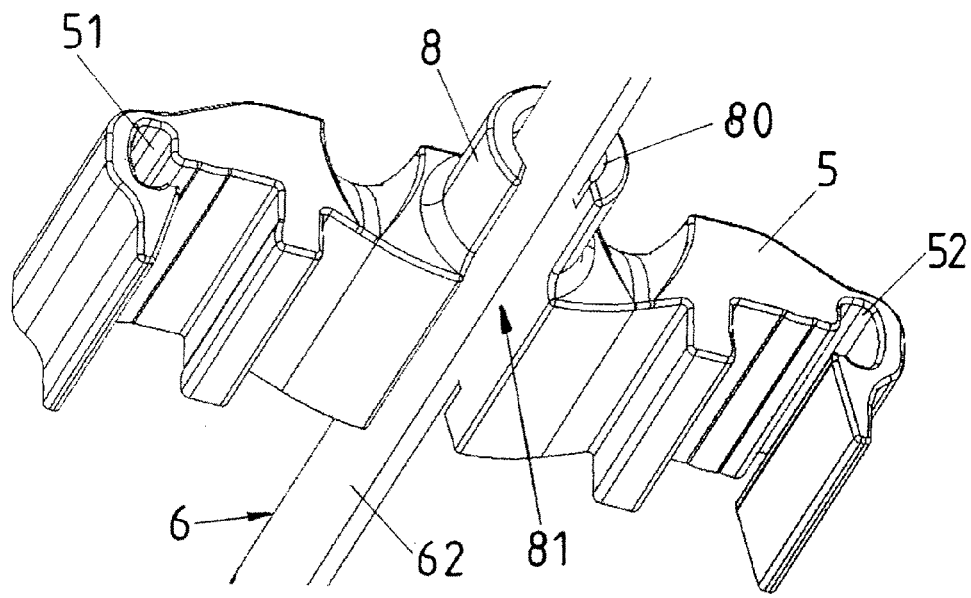
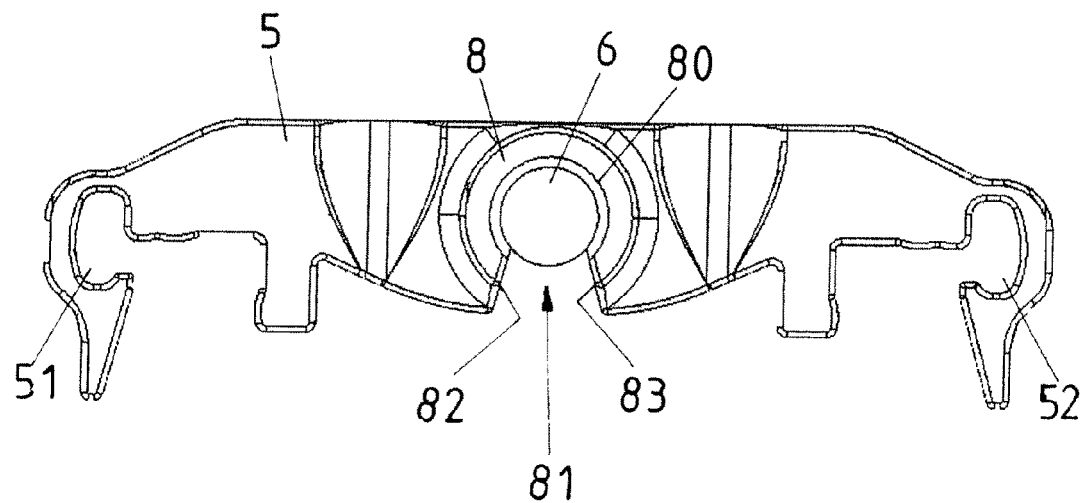

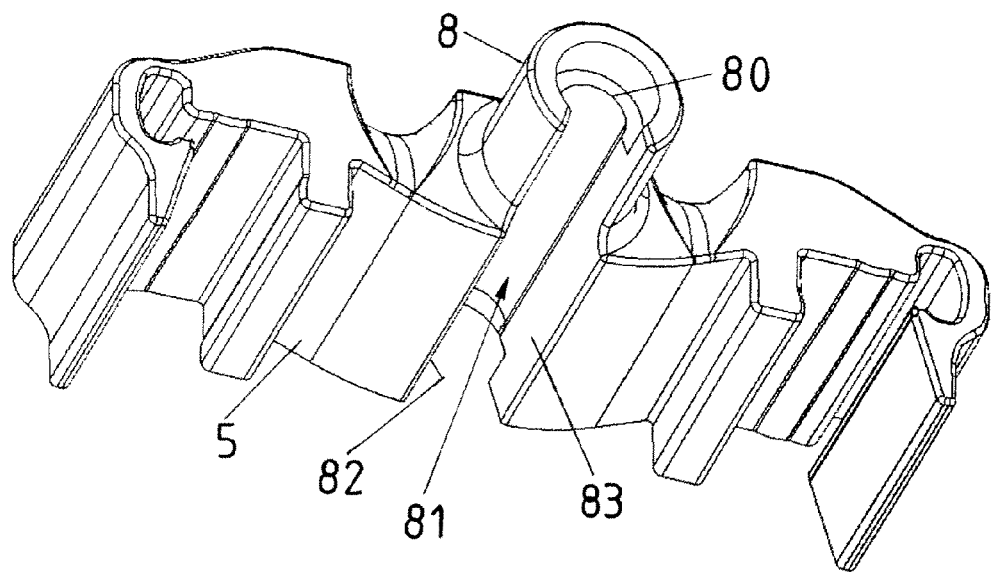
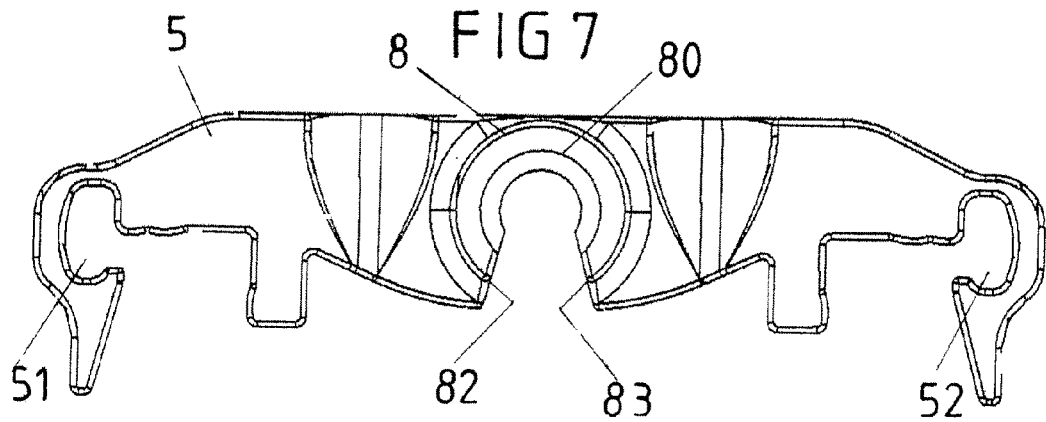

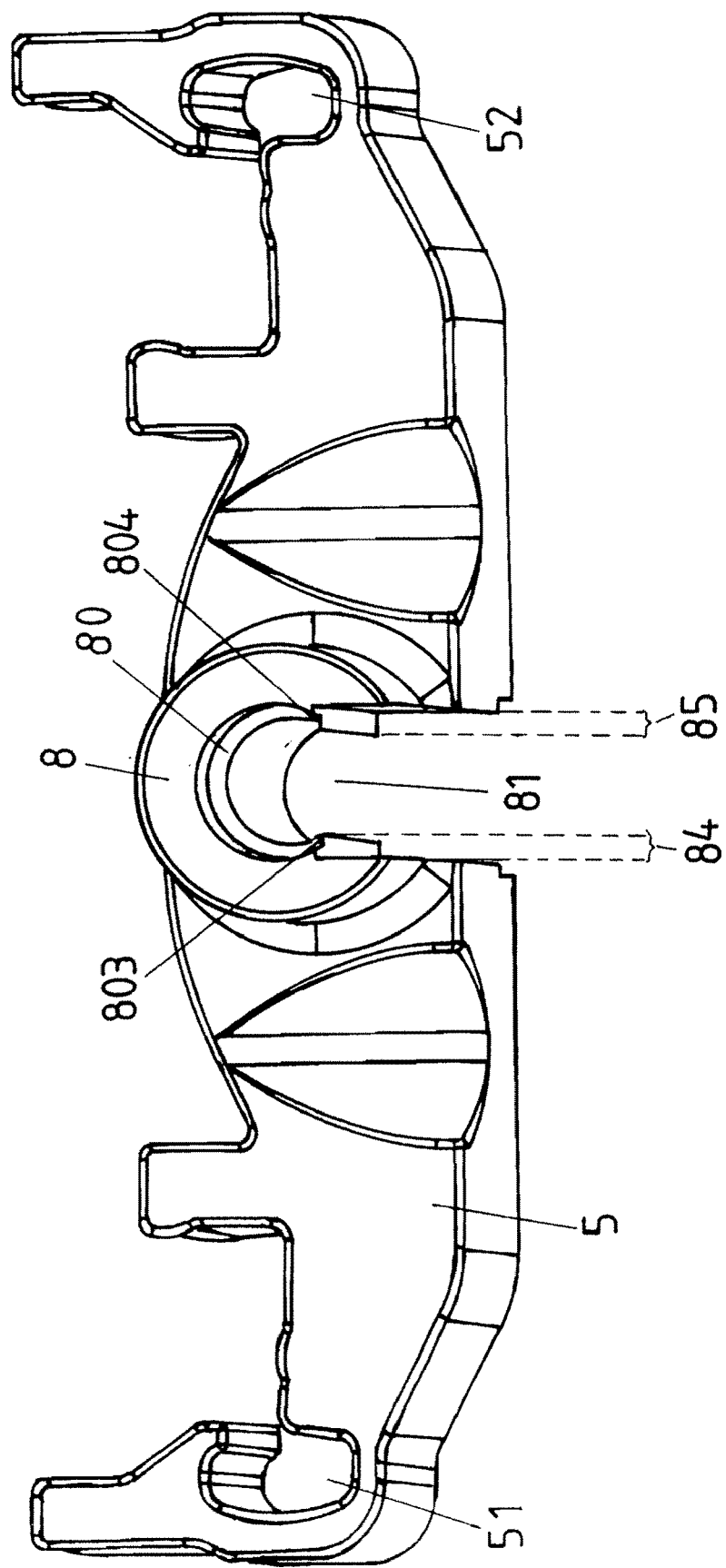

SPINDLE DRIVE FOR A LUMBAR SUPPORT IN THE BACKREST STRUCTURE OF A MOTOR VEHICLE SEAT

CROSS-REFERENCE TO RELATED APPLICATION

This application claims priority to and the benefit of German Patent Application Number 10 2008 047 248.4, filed on Sep. 10, 2008, the entire content of which is incorporated herein by reference.

BACKGROUND

The invention relates to a spindle drive for a lumbar support in a backrest structure for a motor vehicle seat.

Such a backrest structure is known from DE 203 139 25 U1 and comprises a rest frame having a front side facing the back of the seat user along which the back bone of the seat user extends in the longitudinal direction of the rest when the motor vehicle seat is used as intended. A lumbar support arranged at the front side of the rest frame serves for supporting the lumbar vertebra region of the seat user. For adjusting the position of the lumbar support perpendicular to the extension plane of the rest frame and therewith the bulge of a rest cushion that is arranged in front of the rest frame and the lumbar support, an adjusting device is provided that comprises a carrier plate comprising two opposing swivels in the centre of the carrier plate to which two supporting bails are pivotably hinged, which supporting bails extend from the swivel to one of the two lateral boundaries of the carrier plate, wherein the bearing sections of the U-shaped supporting bails are arranged adjacent to each other in the two opposing swivels.

Angled end sections of the substantially U-shaped supporting bails which are formed non-even, but comprise a curvature serve as bearing sections of the supporting bails, so that they define a ramp of variable curvature, respectively, which interacts with an associated glider. Both gliders are respectively guided on a guiding rail arranged or formed on the carrier plate in the extension direction of the legs of the U-shaped supporting bails and thereby reach under both of the supporting bails at their bent sections and interact with these in a ramp-like manner according to the wedge principle, so that upon a movement of the gliders the supporting bails are adjusted with a component perpendicular to the movement direction of the gliders.

Due to the interaction of the gliders with the respectively associated bent ramp-like section of the supporting bails, the supporting bails are pivoted about their respective swivel upon displacing the gliders towards each other such that they act on the lumbar support and adjust it away from the carrier plate perpendicular to the plane spanned by the longitudinal direction of the rest and the horizontal transverse direction.

In order to pivot the supporting bails with respect to the swivels being arranged adjacently towards each other or away from each other, both of the gliders are moved towards each other, namely particularly across the longitudinal direction of the rest. The simultaneous movement of the two gliders in the opposite direction for acting on the supporting bails is caused by a spindle comprising two thread sections having opposite thread pitch, hence a section having a so called left-hand thread and a section having a so called right-hand thread, wherein by means of each of the two thread sections one of the gliders is moved, so that upon a rotational movement of the spindle in the one or the other rotation direction, both of the gliders are moved respectively in opposite directions towards each other or away from each other corresponding to the antidromic pitch of the two thread sections.

Regarding assembly however, this embodiment of the spindle drive for adjusting the lumbar support is associated with high process times when spindling the spindle nuts onto the drive spindle and is not possible concerning certain designs of the spindle drive, for instance in case a thread section is actually not axially accessible or an one-piece spindle having antidromic thread sections is provided with over-moulded parts at the spindle end.

For this reason, divided drive spindles were already suggested, which consist of two parts having antidromic thread sections, which are connected to each other centrally after having spindled the spindle nuts onto the spindle.

SUMMARY

The problem underlying the present invention is to provide a spindle drive for a lumbar support of a backrest structure for a motor vehicle seat of the aforementioned kind which allows for a simple production and assembly process having low expenditure of time while having an arbitrary configuration of the spindle at the same time.

The exemplary solutions according to the invention assure a simple production and assembly process having low expenditure of time while having an arbitrary configuration of the spindle at the same time. Since no involved spindling of the spindle nuts onto the spindle is necessary in the exemplary solution according to an exemplary embodiment of the invention, process times are significantly decreased and new design possibilities of spindles are created, which in particular must not be designed in two parts, so as to allow for a spindling of the spindle nuts onto the spindle. Moreover, the invention can also be employed in case of spindle drives, which in certain circumstances do not allow for a normal assembly where the spindle nuts are spindled onto the spindle.

Basically, it is sufficient for the exemplary solution according to the invention that only one of the two spindle nuts necessary for adjusting the supporting bails partly encompasses the spindle and can be clipped onto its associated thread section of the spindle, or alternatively, is divided in the longitudinal direction of the spindle and the spindle nut parts can be put up onto the spindle and connected to each other in a form-fit or force-fit manner or by adhesive bonds, while the other spindle nut is formed in one piece and completely encompasses its associated thread section of the spindle.

This combination of a conventional spindle nut completely encompassing the spindle with a spindle nut according to an exemplary embodiment of the invention that merely partly encompasses the spindle and is clipped onto it or a spindle nut divided in the longitudinal direction, whose spindle nut parts are put up onto the spindle radially and are connected to each other, offers a highest possible safety, since at the limit or in case of overload the danger exists that particularly the spindle nut being clipped onto the spindle and merely partly encompassing the spindle slips due to the spindle thread being only partly in engagement with the spindle nut thread in the peripheral direction and thus disturbs the function of the lumbar support. In contrast thereto, the spindle nut being spindled onto the spindle and completely encompassing the spindle would be with its spindle nut thread in a firm toothing engagement with the thread of the spindle and therefore assures the function of the lumbar support.

In case of the spindle nut being divided in the longitudinal direction, whose spindle nut parts are put up onto the spindle radially and are connected to each other, this danger is not given in case of corresponding safe resilient connections of the spindle nut parts, however the production and assembly process, even though only slightly, is more involved as in case of a combination of a spindle nut completely encompassing the spindle and a spindle nut encompassing the spindle only partly and being divided in the longitudinal direction.

Alternatively, it is also possible to clip both of the spindle nuts being in engagement with the antidromic thread sections of the spindle and only partly encompassing the spindle observing a highest possible functional safety, in case the spindle nuts that can be clipped onto the spindle nearly completely encompass the spindle after being clipped onto the spindle.

Exemplary, the clipable spindle nut comprises a longitudinal slit running in the longitudinal direction of the spindle, and the spindle nut thread engages with the spindle thread via an enclosure angle 180°<α<360°, wherein with increasing enclosure angle the engagement safety of the spindle nut slotted in the longitudinal direction into the spindle thread increases, while a clipping of the spindle nut onto the spindle is however only possible without the danger of destroying the spindle nut when having a corresponding elasticity of the spindle nut due to the expansion of the spindle nut that is required when clipping the spindle nut onto the spindle. For this reason, the spindle nut encloses, according to a further feature of the invention, the spindle with a maximal enclosure angle in consideration of the elasticity, i.e. the reversible expansibility of the spindle nut.

In a preferred exemplary embodiment the spindle nut encloses the spindle with an enclosure angle of α=330°.

In order to facilitate the clipping of the spindle nut slotted in the longitudinal direction onto the spindle, the boundaries of the longitudinal slit of the spindle nut are slanted according to a further exemplary feature of the invention, such that the distance of the opposing front faces of the longitudinal slit from the periphery towards the threaded hole of the spindle nut is reduced.

Since upon putting the spindle nut on its associated thread section of the spindle the toothing of the thread section hits the wedge-shaped insertion bevel and therefore a non-toothed region of the spindle nut, and since upon clipping the spindle nut onto the spindle the spindle nut is strongly expanded depending on the enclosure angle of the spindle nut thread, an axial guiding effect of the toothings of the spindle nut thread and the thread sections of the spindle to be engaged with each other can hardly develop, i.e. both of the toothings to be engaged with each other can be axially displaced with respect to each other in a way that they are not aligned with each other and therefore cannot engage with each other smoothly.

In order to assure that before clipping the spindle nut onto the spindle the toothings of the spindle nut thread and the thread section associated to the spindle nut are aligned with respect to each other, the longitudinal slit comprises, according to a further feature of the invention, cut-outs setting free the boundaries of the spindle nut thread, so that upon putting the spindle nut on the spindle, the toothing of the spindle nut thread is aligned with respect to the toothing of the thread section of the spindle. Thereby it is assured, that upon clipping the spindle nut onto the spindle, the toothings of the spindle nut thread and of the thread sections of the spindle contact first and can therefore easily engage with each other. In other words: Before clipping the spindle nut onto the spindle, the cut-outs forming a groove cause that the thread teeth of the spindle have already found the thread notches of the spindle nut before the spindle nut is expanded by bringing up a clipping force.

Exemplary, the boundaries of the spindle nut thread adjoining the longitudinal slit comprise conical or wedge-shaped insertion bevels which further facilitate the putting of the spindle nut on the spindle together with aligning the toothings of the spindle nut thread and of the thread sections of the spindle and also assure the alignment upon expanding the spindle nut.

For facilitating the putting of the spindle nut on its associated thread section of the spindle the end of the longitudinal slit being distant to the spindle nut thread is slanted, i.e. the wedge-shaped slants of the longitudinal slit or the cut-outs are expanded at their peripheral ends, so that the spindle nut is guided when putting it onto the spindle.

In an alternative exemplary solution, the spindle nut consisting of at least two shell-shaped spindle nut parts which can be put up onto the spindle radially and can be connected to each other in a form-fit or force-fit manner or by adhesive bonds encompasses the spindle thread completely, so that a maximal toothing engagement between the spindle nut and the spindle is assured.

In case of two spindle nut parts, two half-shell-shaped spindle nut parts encompass the spindle. In case of a spindle nut being composed out of N spindle nut parts the partial shells encompass the spindle in case of uniform division by an angle of 360°/N.

Exemplary, the half-shell-shaped spindle nut halves are connected to each other by means of an integral hinge in the region of the one front face, whereby an easy assembly as well as a corresponding alignment is assured and the spindle nut parts can be held together in a loss-proof manner before the assembly, i.e. before putting them up radially onto the spindle.

The shell-shaped spindle nut parts of the spindle nut divided in the longitudinal direction of the spindle can either consist of metal and the radial front faces of the shell-shaped spindle nut parts can be welded to each other, pressed with each other, clipped or screwed together in the longitudinal direction after being put up radially onto the spindle.

Alternatively, the shell-shaped spindle nut parts of the spindle nut being divided in the longitudinal direction of the spindle can consist of plastic and can be pressed with each other, clipped, screwed together, hot embossed, ultrasonically welded or laser welded in the longitudinal direction after being put up radially onto the spindle.

Alternatively, the half-shell-shaped spindle nut halves or the spindle nut parts of a spindle nut consisting of several spindle nut parts divided in the longitudinal direction can also be connected to each other by axially putting up a bushing encompassing the spindle nut parts or by radially clipping said bushing on the spindle nut parts. Thereby, the bushing encompassing the spindle nut parts comprises an inner contour adapted to the outer contour of the spindle nut parts as well as an inner diameter adapted to the respective outer diameter of the spindle nut parts, so that a firm coherence of the spindle nut parts is assured. A bushing that can be laid around the outer contour of the spindle nut parts radially can be for instance a bushing consisting of two half shells whose half shells are connected to each other by means of a hinge connection and which are laid around the spindle nut parts and are clipped with each other.

Alternatively, at least one ring encompassing the shell-shaped spindle nut parts can be putted up onto the spindle nut parts laid around the spindle, which ring was pushed onto the spindle in beforehand.

BRIEF DESCRIPTION OF THE DRAWINGS

In the following the invention is described in more detail with reference to the embodiments shown in the Drawings.

FIG. 3 shows an isolated perspective view of the spindle drive of the lumbar support having two gliders and a spindle nut slotted in the longitudinal direction of the spindle and completely encompassing the spindle.

FIG. 4 shows a perspective view of a glider with a spindle nut slotted in the longitudinal direction which is clipped onto the spindle.

FIG. 5 shows a cross section through a glider with a spindle nut slotted in the longitudinal direction according to FIG. 4 which is clipped onto the spindle.

FIG. 6 shows an isolated perspective view of the glider with a longitudinally slotted spindle nut according to FIGS. 4 and 5.

FIG. 7 shows a cross section through the glider with a longitudinally slotted spindle nut according to FIG. 6.

FIG. 8 shows a perspective view of a glider with a longitudinally spindle nut and cut-outs at the boundaries of the spindle nut thread.

DETAILED DESCRIPTION

Figure 1:
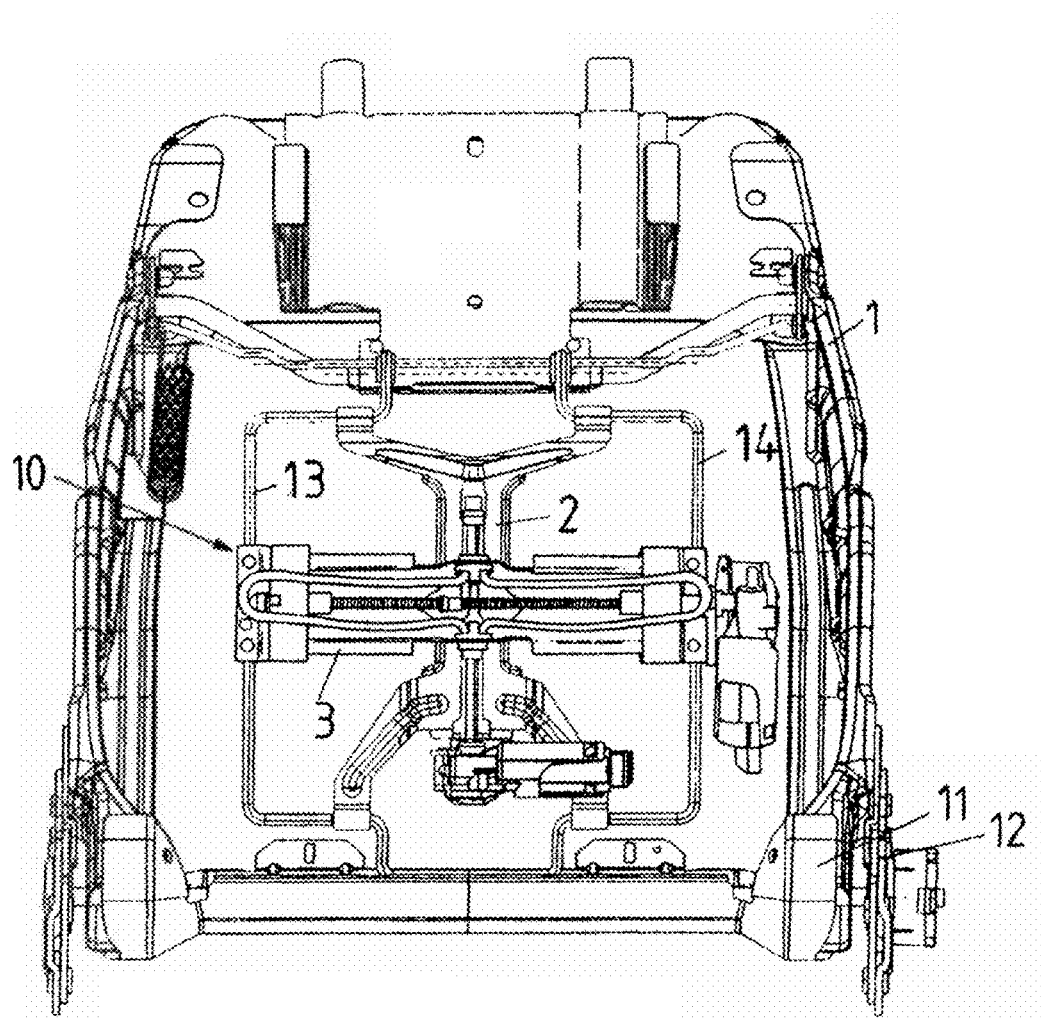
FIG. 1 shows a perspective front view of the backrest structure of a motor vehicle seat having a lumbar support.

FIG. 1 shows a rest frame 1 of a backrest of a motor vehicle seat which is connected to a seat part of a motor vehicle seat via an adjusting axis 11 and fittings 12 and serves for supporting the back of a motor vehicle occupant. The rest frame 1 pivotable about the adjusting axis 11 is substantially aligned in the direction of the vertical vehicle or Z-axis in an upright position and the area spanned by the rest frame 1 extends in the plane of the vertical vehicle or Z-axis and the transverse vehicle or Y-axis. The rest frame 1 is connected to two longitudinal struts 13, 14 aligned parallel with respect to each other, which longitudinal struts 13, 14 receive a lumbar support 10.

For clarifying the alignment of the rest frame 1 and the lumbar support 10, a coordinate system is shown that contains the vertical vehicle or Z-axis, the transverse vehicle or Y-axis and the longitudinal vehicle or X-axis projecting out of the plane of projection or into the plane of projection, respectively.

Figure 2:
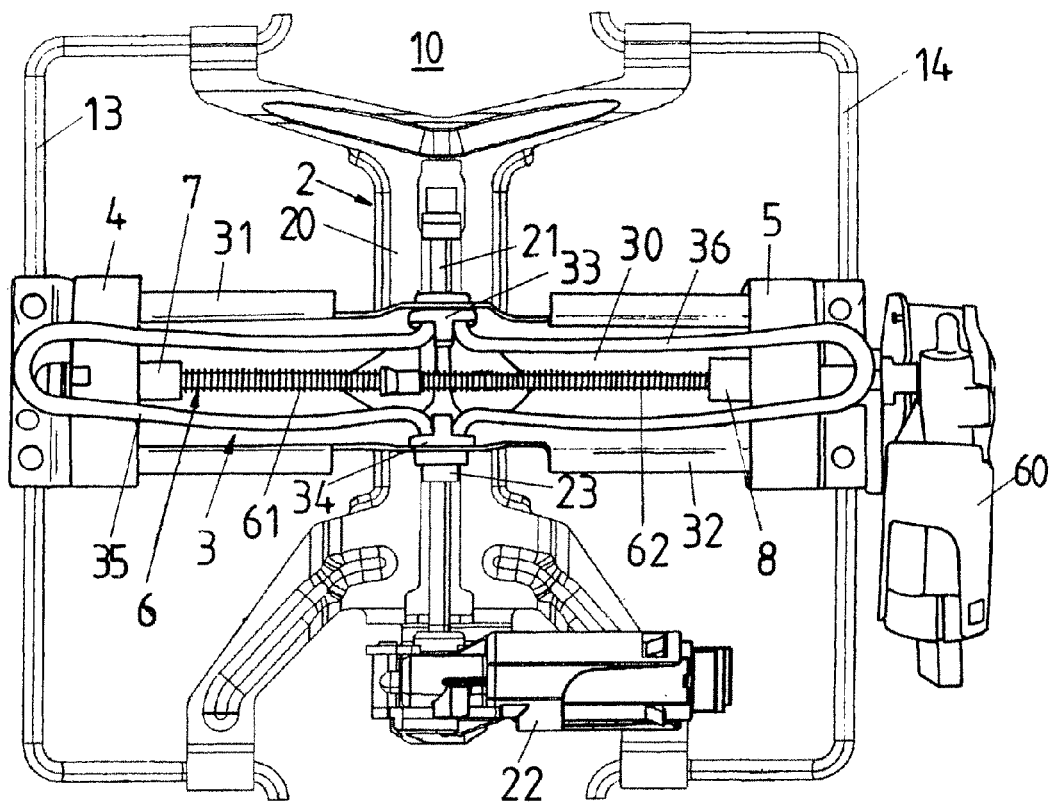
FIG. 2 shows a perspective view of the function elements of the lumbar support.

The isolated lumbar support 10 shown in FIG. 2 comprises a retaining device 2 having a retaining plate 20 and a height adjusting device 21, 22, 23 as well as a carrier 30 having a depth adjusting device 3. The retaining plate 20 comprises four recesses connected to the longitudinal struts 13, 14 and a recess running in the longitudinal direction in which a spindle 21 of the height adjusting device is arranged which is driven by an electromotive spindle drive 22.

A spindle nut 23 meshes with the spindle 21, which spindle nut 23 is connected to the carrier 30 of the depth adjusting device 3 in a rotationally fixed manner so that upon a rotation of the spindle 21 by means of the spindle drive 22 in the one or the other rotation direction, the carrier 30 is moved along the carrier plate 20 upwardly or downwardly. The carrier 30 consists of a profiled, small carrier plate, that extends between the longitudinal struts 13, 14 and is connected to the longitudinal struts 13, 14 via form-fit guiding elements along which the carrier 30 driven by the height adjusting device 21, 22, 23 glides.

Thereby, the carrier 30 extends along the horizontal transverse axis Y, i.e. perpendicular to the longitudinal direction of the rest or the vertical vehicle axis Z from the one longitudinal strut 13 to the other longitudinal strut 14 and is connected to the depth adjusting device 3 by means of which the lumbar support 10 is adjusted perpendicular to the plane spanned by the rest frame 1, i.e. in the X direction of the motor vehicle when the backrest is standing perpendicularly.

The depth adjusting device 3 comprises two supporting bails 35, 36 pivotably hinged to swivels 33, 34 which are centrally connected to the carrier 30 of the depth adjusting device 3. Each of the supporting bails 35, 36 respectively extends from its two ends respectively pivotably hinged to a swivel 33 or 34 to one of the two lateral boundaries of the carrier 30.

Angled end sections of the substantially U-shaped supporting bails 35, 36 which are formed non-even, but define a ramp of variable curvature which interacts with an associated glider 4, 5 of a glider arrangement of the depth adjusting device 3, serve as bearing sections of the supporting bails 35, 36. Both of the gliders 4, 5 are respectively guided on a guiding rail 31, 32 in the extension direction of the legs of the U-shaped supporting bails 35, 36, which guiding rail 31, 32 is arranged or formed on the carrier 30, thereby reaching under both of the supporting bails 35, 36 at their bent sections and interacting with these in a ramp-like manner according to the wedge principle.

The two gliders 4, 5 are movable in opposite directions along the respectively associated guiding rail 31, 32 in the horizontal transverse direction Y by means of a spindle 6 driven by a spindle drive 60, which spindle 6 is connected to a centering element comprising two thread sections 61, 62 having threads of opposite thread pitch, namely a thread section 61 having a left-hand thread and a thread section 62 having a right-hand thread. Each of the two thread sections 61, 62 interacts with a corresponding internal thread of a spindle nut 7, 8 formed in the two gliders 4, 5, wherein the corresponding internal thread can alternatively also be formed by a spindle nut 7, 8 which is connected to both of the gliders 4, 5 respectively, particularly pressed in.

Due to the different pitch of both of the tread sections of the spindle 6 both of the gliders 4, 5 are moved in opposite directions either towards each other, i.e. towards the retaining device 2 or away from each other, i.e. towards a lateral boundary of the carrier 30 or towards the longitudinal struts 13, 14 upon a rotation of the spindle 6 depending on the rotation direction of the spindle drive 60.

Due to the interaction of the gliders 4, 5 with the respectively associated bent ramp-like section of the one or the other supporting bail 35, 36 the supporting bails 35, 36 are pivoted about their respective swivel 33, 34 upon displacing the gliders 4, 5 towards each other so that their ends are moved towards each other. Thus, the lumbar support 10 is adjusted away from the carrier 30 along the longitudinal vehicle axis X perpendicular to the plane spanned by the longitudinal direction of the rest Z and the horizontal transverse direction Y, wherein the position of the lumbar support 10 changes along said longitudinal vehicle direction X and/or the lumbar support 10 is bent in this direction, depending whether the support of the lumbar support 10 on the rest frame 1 allows for a displacement of the lumbar support 10 along the X direction or merely allows for a bending.

In contrast thereto, in case both of the gliders 4, 5 are moved in opposite directions in the direction of one of the two lateral longitudinal struts 13, 14, respectively, both of the supporting bails 35, 36 are flapped towards the carrier 30, so that the bulge of the lumbar support 10 decreases or the lumbar support 10 moves again closer to the carrier plate 40 or the plane of the backrest.

FIG. 3 shows in an enlarged, perspective, and exploded view the spindle drive for the depth adjusting device 3 of the lumbar support 10 with the spindle 6 and both of the thread sections 61, 62 having left-hand and right-hand threads and an end sided tooth wheel 63 that is coupled to the electromotive spindle drive 60 according to FIG. 2. Both of the gliders 4, 5 interacting with the supporting bails 35, 36 comprise at their lateral ends guiding grooves 41, 42 or 51, 52, which encompass correspondingly formed guiding rails 31, 32 of the carrier 30 and are guided in the longitudinal direction of the carrier 30.

One of the gliders 4 is connected to a spindle nut 7 completely encompassing the spindle 6 or the thread section 61 associated to the glider, which spindle nut 7 is preferably formed as a part of the glider 4. Particularly, the glider 4 and the spindle nut 7 consist of plastic and are preferentially produced by means of an injection moulding method.

The other glider 5 is connected to a spindle nut 8 which is also preferentially formed as a part of the glider 5. This spindle nut 8 encompasses in contrast to the spindle nut 7 of the glider 4 the spindle 6 or the thread section 62 associated to the spindle nut 8 not completely, but comprises a longitudinal slit 81, so that the spindle nut 8 only partly encompasses the spindle 6 and the thread of the spindle nut 8 engages the thread section 62 merely via a part of the periphery of the thread section 62 of the spindle 6.

Two cuts 43, 44 or 53, 54 laterally arranged with respect to the spindle nuts 7, 8 comprise a bent bottom which forms a part of the ramp for adjusting the supporting bails 35, 36 according to FIG. 2.

As can be inferred particularly from the perspective view according to FIG. 4 and the cross section shown in FIG. 5 of the glider 5 clipped onto the spindle 6, the spindle nut 8 encompasses the spindle 6 and engages with its spindle nut thread 80 with the second thread section 62 of the spindle 6 via an enclosure angle which for form-fittedly connecting the spindle nut 8 or the glider 5 is larger than 180° and as a consequence of the longitudinal slit 81 is smaller than 360°. In the embodiment shown in FIGS. 4 and 5 the enclosure angle amounts to approximately 330°. Thereby, the enclosure angle is to be chosen such that the spindle nut 8 can be clipped onto the spindle 6 by means of a suitable tool, without having for the required expansion of the spindle nut 8 or the central section of the glider 5 the danger of a crack or a damage of the spindle nut 8 or the glider 5.

For facilitating the clipping onto the spindle 6 and the expansion of the spindle nut 8 of the glider 5 required therefor, the opposing front faces 82, 83 limiting the longitudinal slit 81 are slanted in a wedge shaped manner, i.e. the mutual distance of the front faces 82, 83 decreases from the periphery of the spindle nut 8 towards the spindle nut thread 80 or the spindle 6 receiving the spindle nut 8.

In FIGS. 6 and 7 the glider 5 with the spindle nut 8 is shown in a perspective view and in a cross section without reference to the spindle 6 and points up the length of the spindle nut thread 80 as well as the contour of the spindle nut 8 in the region of the longitudinal slit 81 with the radial front faces 82, 83 laterally limiting the longitudinal slit 81.

Since upon putting up the spindle nut 8 onto the spindle 6, the wedge-shapedly slanted front faces 82, 83 of the longitudinal slit 81 limiting the longitudinal slit 81 are strongly expanded depending on the enclosure angle of the spindle nut thread 80, particularly in case of large enclosure angle, wherein also the toothing of the spindle nut thread 80 is pushed apart far, the danger exists, that the toothings of the spindle nut thread 80 and of the thread section 62 of the spindle 6 associated to the spindle nut 8, i.e. the thread teeth of the thread section 62 of the spindle 6 and the thread notches of the spindle nut thread 80, that are to be engaged with each other, do not find each other due to the expansion. For this reason, in the embodiment shown in FIGS. 8 and 9, the boundaries of the longitudinal slit 81 are formed as cut-outs 84, 85, which set free the spindle nut thread 80, so that upon putting on the spindle nut 8 onto the spindle 6 the toothings of the spindle nut thread 80 and of the thread section 62 of the spindle 6 associated to the spindle nut 8 can be aligned with respect to each other, before the clipping-on of the spindle nut 8 onto the spindle 6 and the pushing-apart of the spindle nut 8 takes place.

FIG. 8 shows a glider 5 in a perspective view with a spindle nut 8 formed or inserted therein having a longitudinal slit 81 running in the longitudinal direction of the spindle 6. In contrast to the embodiment of the glider 5 shown in FIGS. 4 to 7, the boundaries of the longitudinal slit 81 are however not slanted in a wedge-shaped manner, but comprise the cut-outs 84, 85, which are formed for instance by milling a groove into the longitudinal slit 81. The cut-outs 84, 85 set free the boundaries 803, 804 of the spindle nut thread 80 and thereby cause that upon putting on the glider 5 or the spindle nut 8 onto the spindle 6 the toothings of the spindle nut thread 80 and of the thread section 62 of the spindle 6 can be aligned with respect to each other, before the spindle nut 8 is expanded by bringing up a clipping force and is clipped onto the spindle 6.

Figure 9:
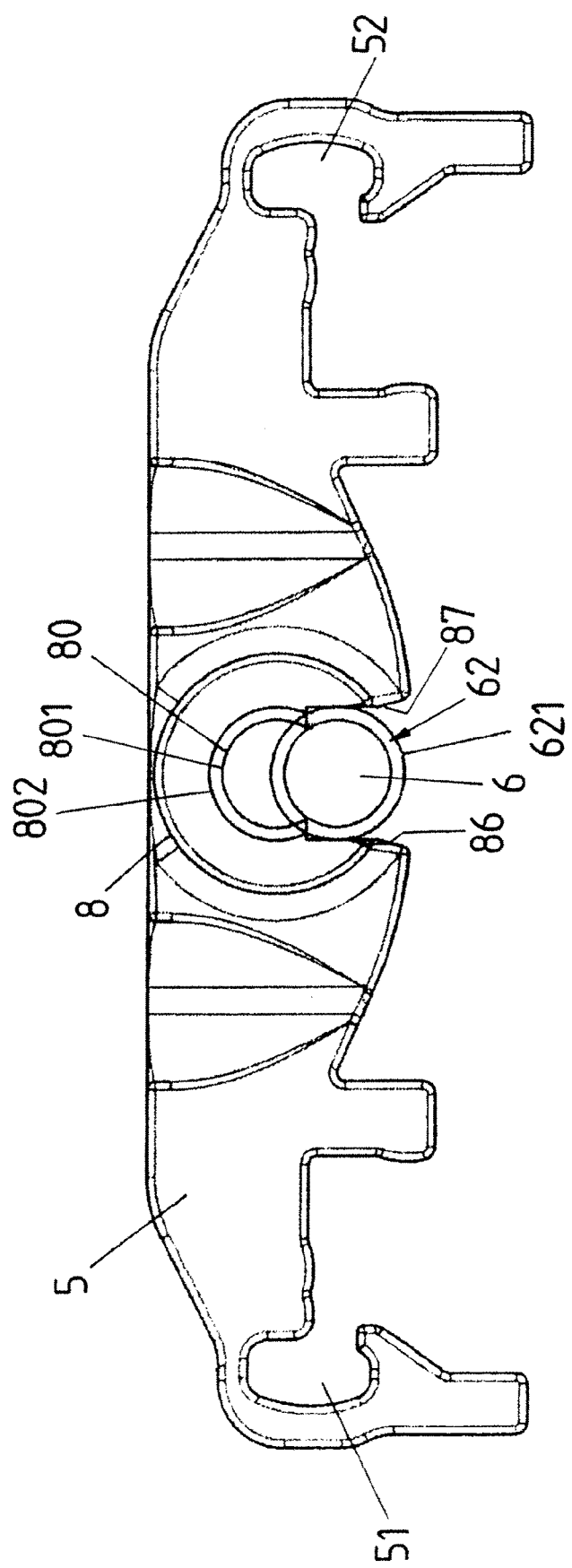
FIG. 9 shows a cross section through the glider according to FIG. 8 upon putting it on its associated thread section of the spindle before clipping the spindle nut onto the spindle.
Figure 10:
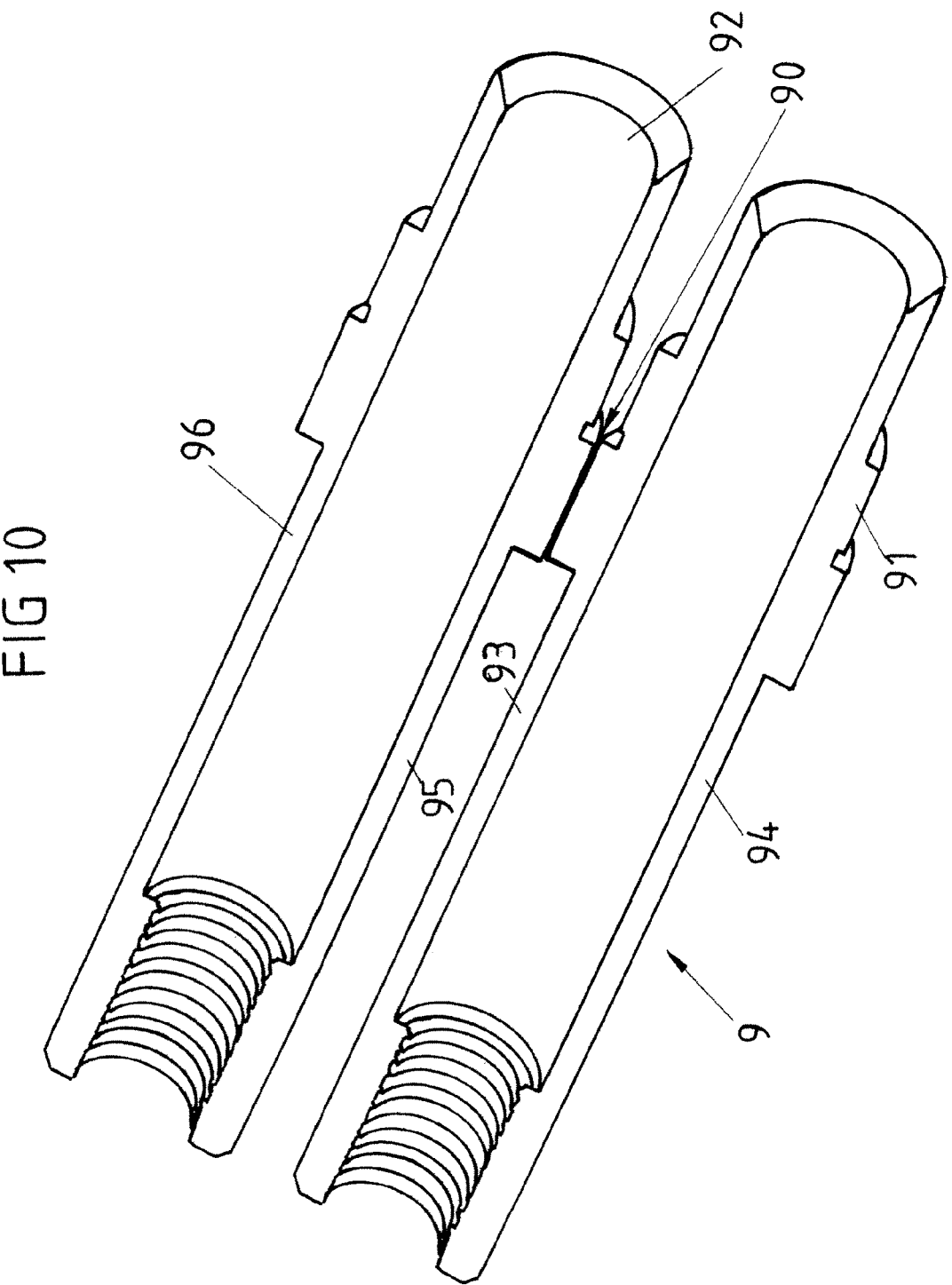
FIG. 10 shows a perspective view of two shell-shaped spindle nut halves being connected to each other via an integral hinge.

FIG. 9 points up in a cross section through the glider according to FIG. 8 the effects of the cut-outs 84, 85 upon putting on the glider 5 or the spindle nut onto the spindle 6.

The groove of the longitudinal slit 81 formed by the cut-outs 84, 85 comprises a width which corresponds to the diameter of the tip circle 621 of the thread section 62 of the spindle 6. Therefore, the glider 5 or the spindle nut 8 with the longitudinal slit 81 can be put up onto the spindle 6 without bringing up a clipping force until the toothing of the spindle nut thread 80 set free by the cut-outs 84, 85 butts with its tip circle 801 and root circle 802 against the thread section 62 of the spindle 6 with the tip circle 621 and the root circle 622 and can be aligned in a way that the thread teeth of the thread section 62 of the spindle 6 finds the thread notches of the spindle nut thread 80. By means of further pressing the glider 5 or the spindle nut 8 onto the spindle 6, the spindle nut 8 is expanded corresponding to its enclosure angle and is, while having already toothings of the spindle nut thread 80 and of the thread section 62 of the spindle 6 being aligned with respect to each other, clipped onto the spindle 6.

Preferably, the ends of the spindle nut toothings 80 adjoining the longitudinal slit 81 comprise conical or wedge shaped insertion bevels 803, 804, which secure the toothing engagement of the spindle nut thread 80 and the thread section 62 and facilitate the clipping-on of the spindle nut 8 onto the spindle 6.

In order to facilitate the putting-on of the spindle nut 8 onto the spindle 6, the peripheral ends of the longitudinal slit 81 are provided with wedge-shaped slants 86, 87 which facilitate the "threading" of the spindle nut 8 onto the spindle 6.

For assembly of the spindle drive according to FIG. 3, at first the spindle nut 7 completely encompassing the spindle 6 and being in engagement with the first thread section 61 of the spindle 6 is spindled onto the spindle 6 by cranking the glider 4 in the corresponding rotation direction onto the spindle 6 or by rotating the spindle 6 in case of a fixed glider 4. Subsequently, the spindle nut 7 is brought into a position of the spindle 6 which for instance corresponds to the outer end stop, in which the supporting bails 35, 36 butt against the carrier plate 30. Subsequently, the spindle nut 8 slotted in the longitudinal direction with the glider 5 is also clipped onto the spindle 6 in a region of the outer end, so that both gliders 4, 5 take a substantially symmetric position with respect to the supporting bail pivot points.

Preferably, adjusting aids are employed during assembly of the gliders 4, 5 which allow for an exact positioning of the glider 4 spindled onto the spindle 6 or the spindle nut 7 connected to the glider 4 and an exact positioning of the spindle nut 8 slotted in the longitudinal direction with the glider 5 connected to the spindle nut 8 that is to be clipped onto the spindle 6.

Instead of the spindle nut 8 slotted in the longitudinal direction with the longitudinal slit 81 for clipping onto the second thread section 62 of the spindle 6 associated to the slotted spindle nut 8 as shown in FIGS. 3 to 7, a spindle nut 9 being divided in the longitudinal direction as shown in FIG. 8 in a schematic-perspective view can be employed which consists of two shell-shaped thread nut halves 91, 92 with partial threads formed therein, which are connected to each other via an integral hinge 90. The shell-shaped thread nut halves 91, 92 respectively encompass 180° of the spindle 6 and are put up onto the spindle 6 radially, for instance, and are, depending on the use material of the shell-shaped thread nut halves 91, 92, welded to each other, pressed with each other, clipped, screwed together, hot embossed, ultrasonically welded or laser welded with each other in a suitable manner.

While the shell-shaped thread nut half 91 is for instance connected to the glider 5 according to FIG. 3, the other shell-shaped thread nut half 92 can also be put up onto the spindle 6 in the radial direction after having put up the glider with the first thread nut half 91 onto the thread section 62 of the spindle 6, so that subsequently the radial front faces 93, 94 or 95, 96 of both of the shell-shaped thread nut halves 91, 92 can be welded, pressed, clipped, screwed together, hot embossed, ultrasonically welded or laser welded with each other.

Alternatively, the thread nut half 91 is connected via an integral hinge 90 in a region of the radial front face 93 with the other thread nut half 92 in a region of the other radial front face 95 so that after the putting-up of the glider with the thread nut half 91 onto the thread section 62 of the spindle 6 by means of turning down the other thread nut half 92, this thread nut half 92 engages with the thread section 62 of the spindle 6, whereupon the front face 94 of the thread nut half 91 opposite to the integral hinge 90 is welded, pressed, clipped, screwed, hot embossed, ultrasonically welded or laser welded with the opposing front face 96 of the other thread nut half 92.

Instead of a connection of the thread nut halves 91, 92 by means of welding, clipping, screwing, hot embossing, ultrasonic welding or laser welding, also a bushing can be laid around both of the thread nut halves 91, 92 and can be for instance clipped onto the thread nut halves 91, 92 like a clasp, or a bushing pushed onto the spindle in beforehand can be put up onto the two thread nut halves 91, 92 axially.

Also in this embodiment the divided spindle nut preferentially consists of plastic. But also a metal can be employed as a material for the spindle nut, wherein the divided spindle nut is produced by metal forming, particularly by means of cold extrusion or hot extrusion. The tools required for this purpose do not need cores for producing the threads, but can be designed as a simple "on-off-tool" having corresponding short cycle times. Depending on the thread pitch minor undercuts may result, wherein a spindle nut produced out of plastic can be force-demoulded.

In case the divided spindle nut is notably long, axial grooves can be provided through the half-like embodiment in general and particularly in the region of the undercut, in which grooves lubricant can be stored. The spindle nut halves may also be held together by rings or a bushing. Preferably, precisely positioning geometries are to be provided in the halves, which align the halves with respect to each other. Particularly, grooves can be designed such that they promote the insertion of lubricant into the thread, for instance by the arrangement of bevels. A further variant consists of producing the construction out of at least two different materials, here, one material is optimized with respect to sliding friction, another material has better mechanical properties, for instance better strength.

The advantage of producing spindle nuts that are divided in the longitudinal direction further consists in that a fast, non-cutting production method is possible and grooves in the axial direction for receiving lubricant are possible, which cannot be profitably produced without a corresponding division. A tearing of the lubricant film over the thread length can be avoided by the lubrication grooves.

A further advantage consists in that the torn inserts may be changed simply, in case of a rotationally symmetric design of the halves, both halves can be produced in one cavity by means of changing thread inserts. By means of the arrangement of lubrication grooves, an improved lubricant insertion into the thread is caused during movement which is more save.

What is claimed is:

1. A seat rest frame of a motor vehicle seat, the seat rest frame comprising a spindle drive for a lumbar support in a backrest of the motor vehicle seat having a rest frame forming a supporting structure of the backrest, the lumbar support arranged at a front side of the rest frame for supporting a back region of a motor vehicle occupant, wherein the lumbar support has a carrier and a supporting device hinged to the carrier and being adjustable perpendicular to the carrier, the supporting device comprising two supporting bails extending perpendicular to a longitudinal direction of the backrest, wherein the supporting bails are pivotably hinged to the carrier about an axis extending in a longitudinal direction of the rest frame, the spindle drive comprising:

a spindle having two thread sections of opposite thread pitch;

two gliders guided on the carrier, wherein each of the gliders is connected to a spindle nut having a thread engaging an associated one of the thread sections such that the gliders are movable in opposite directions and pivot the supporting bails toward and away from the carrier; and wherein at least one of the spindle nuts merely partly encompasses the spindle and is configured to be clipped onto its associated thread section of the spindle.

2. The seat rest frame according to claim 1, wherein the at least one spindle nut comprises a longitudinal slit running in a longitudinal direction of the spindle, and the at least one spindle nut thread engages with its associated thread section of the spindle via an enclosure angle of $180°<\alpha<360°$.

3. The seat rest frame according to claim 2, wherein the at least one spindle nut encloses the spindle with a maximal enclosure angle in consideration of an elasticity of the at least one spindle nut or of the associated glider, wherein the associated glider is connected to the at least one spindle nut or wherein the spindle nut is formed on the associated glider.

4. The seat rest frame according to claim 2, wherein the at least one spindle nut encloses the spindle with an enclosure angle of $\alpha=330°$.

5. The seat rest frame according to claim 2, wherein radial front faces of the longitudinal slit of the at least one spindle nut are slanted, such that the distance of the radial front faces of the longitudinal slit aligned towards each other decreases from the periphery towards the at least one spindle nut thread.

6. The seat rest frame according to claim 2, wherein the longitudinal slit comprises a cut-out for setting free boundaries of the at least one spindle nut thread, such that upon putting the at least one spindle nut on the spindle, the toothing of the at least one spindle nut thread is configured to be aligned with the toothing of the associated thread section of the spindle.

7. The seat rest frame according to claim 6, wherein the cut-outs form a groove, wherein the width of the groove substantially corresponds to a tip diameter of the thread sections of the spindle.

8. The seat rest frame according to claim 6, wherein the boundaries of the at least one spindle nut thread adjoining the longitudinal slit comprise conical or wedge-shaped insertion bevels.

9. The seat rest frame according to claim 2, wherein a peripheral end of the longitudinal slit that is farthest from the at least one spindle nut thread is slanted.

10. A seat rest frame of a motor vehicle seat, the seat rest frame comprising:
  a spindle drive for a lumbar support in the backrest of a motor vehicle seat having a rest frame forming a supporting structure of the backrest, the lumbar support arranged at a front side of the rest frame for supporting a back region of a motor vehicle occupant, wherein the lumbar support has a carrier and a supporting device hinged to the carrier and being adjustable perpendicular to the carrier, the supporting device comprising two supporting bails extending perpendicular to a longitudinal direction of the backrest, wherein the supporting bails are pivotably hinged to the carrier about an axis that extends in a longitudinal direction of the rest frame, the spindle drive comprising:
  a spindle having two thread sections of opposite thread pitch;
  two gliders guided on the carrier, wherein each of the gliders is connected to a spindle nut having a thread engaging an associated one of the thread sections such that the gliders are movable in opposite directions and pivot the supporting bails toward and away from the carrier; and
  wherein at least one of the spindle nuts comprises at least two shell-shaped spindle nut parts divided in a longitudinal direction of the spindle, wherein the spindle nut parts are configured to be radially placed onto the spindle and are connectable to each other in a form-fit or force-fit manner or by adhesive bonds.

11. The seat rest frame according to claim 10, wherein the two shell-shaped spindle nut parts consist of two shell-shaped spindle nut halves divided in the longitudinal direction, wherein the two shell-shaped spindle nut halves are connectable to each other after being placed onto the spindle.

12. The seat rest frame according to claim 10, wherein the shell-shaped spindle nut parts are connected to each other with an integral hinge in a region of a radial front face.

13. The seat rest frame according to claim 10, wherein the shell-shaped spindle nut parts of the at least one spindle nut consists of metal and wherein after the shell-shaped spindle nut parts are placed radially onto the spindle, the radial front faces of the shell-shaped spindle nut parts are welded to each other, pressed with each other, clipped with each other, or screwed together in the longitudinal direction.

14. The seat rest frame according to claim 10, wherein the shell-shaped spindle nut parts of the spindle nut consist of plastic and wherein after radially placing the shell-shaped spindle nut parts onto the spindle, the radial front faces of the shell-shaped spindle nut parts are pressed with each other, clipped with each other, screwed together, hot embossed, ultrasonically welded or laser welded with each other.

15. The seat rest frame according to claim 10, wherein a bushing encompassing the shell-shaped spindle nut parts or at least a ring encompassing the shell-shaped spindle nut parts is configured to be axially or radially clipped onto the shell-shaped spindle nut parts.

* * * * *